United States Patent Office 3,344,706
Patented Oct. 3, 1967

3,344,706
OPTICAL PROJECTOR WITH PROJECTION LENS ADJUSTMENT MEANS
William Dian, 81—56 192nd St., Hollis, N.Y. 11423
Filed July 6, 1965, Ser. No. 469,525
3 Claims. (Cl. 88—24)

ABSTRACT OF THE DISCLOSURE

An optical projector for creating light patterns, in which the projecting lens is mounted for rotation about axes perpendicular to the principal axis of the projection lens, and perpendicular to each other.

This invention relates generally to the field of lighting equipment, and more particularly to an improved optical projector of the type used for providing colored displays in abstract patterns.

It is among the principal objects of the present invention to provide an improved colored light optical projector incorporating provision for adjusting the projection lens element, not only for focusing with respect to a focal plane but for rotation about an axis perpendicular to the normal axis of projection.

Another object of the invention lies in the provision of improved control means whereby rotational adjustment of the projection lens may be accomplished by predetermined finite increments, or by a continuous motion, to create interesting optical effects.

Yet another object of the invention lies in the provision of means for simultaneously rotating the projection lens element of an optical projection system about two separate axes, each of which is perpendicular to the normal projection axis.

A further object of the invention lies in the provision of an improved optical projector of the class described, and possessed of the above advantages, in which the cost of fabrication may be of a reasonably low order, with consequent wide sale, distribution and use.

A feature of the disclosed embodiment lies in the provision of a texture element positioned at or near the focal plane of the device for introducing controlled chromic distortions, operating in conjunction with a pattern element which shapes the image cast by the system.

Another feature of the invention lies in the relative simplicity of the moving mechanical parts, thereby facilitating not only operation but servicing as well.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
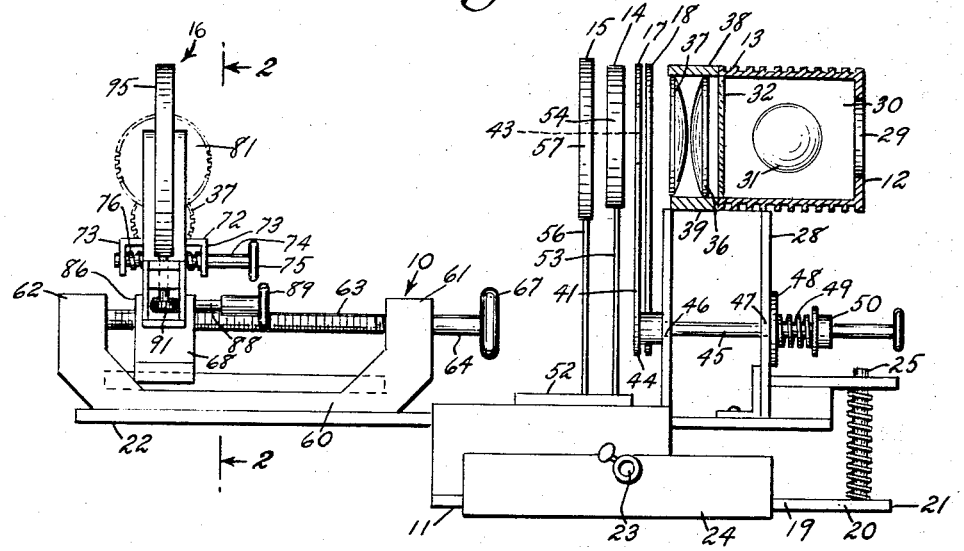
FIGURE 1 is a side elevational view of an embodiment of the invention.
Figure 2:
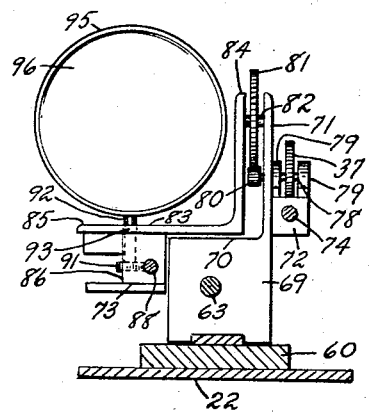
FIGURE 2 is a transverse sectional view as seen from the plane 2—2 in FIGURE 1.
Figure 3:
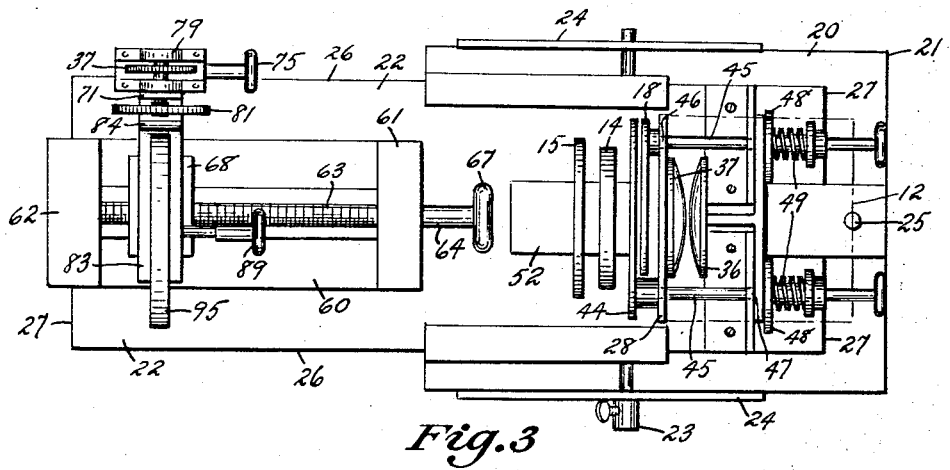
FIGURE 3 is a plan view thereof.

In accordance with the invention, the device, generally indicated by reference character 10, comprises broadly: a base element 11, a lamp element 12, a condensing element 13, a texture element 14, a pattern element 15, a projecting lens element 16, filter elements 17 and 18.

The base element 11 includes a relatively fixed base member 19 of generally rectangular planar configuration and bounded by longer edges 20 and shorter edges 21. Disposed above the base member 19 is a pivotally mounted member 22 supported on a shaft 23 engaged in brackets 24. Pivotal movement is determined by an adjusting screw 25 for the purpose of adjusting the vertical position of the cast image on a screen (not shown). The member 22 is also generally rectangular in configuration, being bounded by longer edges 26 and shorter edges 27.

The lamp element 12 is of conventional type and is supported upon a vertically disposed bracket 28 from the member 22. It includes a housing 29 defining a cavity 30 in which a lamp 31 is disposed. A front wall 32 of the housing 29 includes a circular opening for the egress of light. The lamp 31 is mounted in a conventional socket (not shown) and is provided with power through a conventional conductor (not shown).

The condensing element 13 is of conventional type, including a pair of condensing lenses 36 and 37 supported between an upper bracket 38 and a lower bracket 39.

The filter elements 17 and 18 each include an arcuately-shaped plate 41 having openings 42 in which colored filters (not shown) are disposed. The plate 41 is supported at a lower corner 44 by a shaft 45 which passes through openings 46 and 47 in the bracket 28. To maintain a selected filter 43 in position in front of the condensing element 13, there is provided a friction lock 48 which is urged against a side surface of the bracket 28 by a spring 49 maintained in position by a collar 50 on the shaft 45.

The texture element 14 is mounted upon a base 52 which supports a vertically disposed shaft 53, and includes a synthetic resinous transparent member 54 having a predetermined pattern thereon. This pattern is translucent, and serves to induce color fringes and other desired mutations in the light rays emanating from the condensing element 13. The member 54 is interchangeable with other similar members having different textures as desired.

The pattern element 15 is generally opaque, and is mounted on a shaft 56 on the base 52, the shaft 56 supporting a template 57 having cut-out portions which determine the shape of the projected image, as distinguished from its color.

The projecting lens element 16 is of any desired focal length, preferably at least six or seven inches, to permit the same to be spaced from the pattern element a distance sufficient to allow the adjustments of the same described hereinbelow. It includes a chassis member 60 supported on the member 22 having first and second bearings 61 and 62 supporting a lead screw 63 in generally horizontal orientation. At one end 64 is a collar engaging a control knob 67. Rotation of the knob 67 rotates the lead screw 63, resulting in travel of the lead nut 68 mounted thereupon. The nut 68 is connected to an L-shaped movable frame 69 having a horizontal member 70 and a vertical member 71. The vertical member 71 in turn supports an auxiliary frame 72 having lower brackets 73. A horizontally disposed shaft 74 is journalled in the brackets 73, and is provided with a control knob 75 which operates a worm 76 engaging a gear 77 on a transversely disposed shaft 78, the shaft 78 being retained in bearings 79. One end of the shaft 78 penetrates the vertical member 71, and mounts a pinion 80 driving a gear 81 on a horizontally disposed shaft 82.

The shaft 82, which is also journalled within the vertical member 71, supports a second L-shaped frame 83 including a vertical member 84 and a horizontal member 85. Extending downwardly from the horizontal member 85 is a vertical bracket 86 having a bearing supporting a shaft 88 operated by a knob 89. The shaft 88 includes a worm (not shown) driving a gear 91 mounted on a vertical shaft 92 in a thrust bearing 93. The upper end of the shaft 92 mounts the rim 95 of a projection lens 96.

From a consideration of the above description, it will be apparent that rotation of the knob 67 serves to move the lens 96 toward and away from the pattern element 15 to focus the same upon the template member 57. Rotation of the knob 75 will result in rotation of the frame 83 about a horizontal axis through the optical center of the lens 96, and rotation of the knob 89 will result in rotation of the rim 95 with respect to the frame 83, wherein the lens executes rotation about a vertical axis. While the present embodiment contemplates that these adjustments are made manually by an operator, it will be understood that by provision of suitable motor means (not shown) all three adjustments may be simultaneously performed for additional effects.

I wish it to be understood that I do not consider the invention limited to the precise details of structure shown and set forth in this specification, for obvious modifications will occur to those skilled in the art to which the invention pertains.

I claim:

1. In an optical projector for producing decorative light patterns, including a projection objective lens, a focal plane having an image to be projected, and a light source adjacent said focal plane, the improvement comprising: first means for moving said objective lens along a fixed axis toward and away from said focal plane, second means for rotating said objective lens about a second axis perpendicular to said first-mentioned axis, and third means for rotating said objective lens about a third axis perpendicular to each of said first and second axes.

2. In an optical projector for producing decorative light patterns, including a projection objective lens, a focal plane having an image to be projected, and a light source adjacent said focal plane, the improvement comprising: first means for moving said objective lens along a fixed axis toward and away from said focal plane, second means for rotating said objective lens about a second axis perpendicular to said first-mentioned axis, and third means for rotating said objective lens about a third axis perpendicular to each of said first and second axes; said first-mentioned means including a lead screw, a lead nut engaged upon said screw and an L-shaped frame supported upon said lead nut; said second means including a bracket supported by said L-shaped frame, a shaft carried for rotation about its own principal axis by said bracket, a second shaft supported in skew relation to said first-mentioned shaft, a gear on said second shaft driven by a worm on said shaft, and a second L-shaped frame supported by said second shaft; said third means including a third shaft supported by said second L-shaped frame supported by said second shaft; said third means including a third shaft supported by said second L-shaped frame, a second worm on said third shaft, and a fourth shaft supported in skew relation to said third shaft, having a gear driven by said second worm.

3. An optical light ray projector comprising: a lamp element, a condensing element juxtaposing said light element, a texture element positioned adjacent said condensing element, and a pattern element juxtaposing said texture element; a projecting lens element having a first focus axis, means for focusing said lens element along said first axis, means for rotating said lens element about a second axis perpendicular to said first focus axis, and means for rotating said lens element about a third axis perpendicular to each of said first and second axes.

References Cited
UNITED STATES PATENTS

| | | | |
|---|---|---|---|
| 1,501,161 | 7/1924 | Cooke | 88—24 |
| 1,876,511 | 9/1932 | Oberg et al. | 240—3.1 |
| 2,029,938 | 2/1936 | Newman | 88—24 |

NORTON ANSHER, *Primary Examiner.*

R. M. SHEER, *Assistant Examiner.*